(12) United States Patent
Nguyen et al.

(10) Patent No.: US 9,969,926 B2
(45) Date of Patent: May 15, 2018

(54) METHODS FOR CONSOLIDATION TREATMENTS IN SUBTERRANEAN FORMATIONS USING SILICON COMPOUNDS DERIVED FROM FURFURYL ALCOHOLS

(71) Applicant: Halliburton Energy Services, Inc., Houston, TX (US)

(72) Inventors: Philip D. Nguyen, Houston, TX (US); Thomas D. Welton, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/281,856

(22) Filed: Sep. 30, 2016

(65) Prior Publication Data

US 2017/0015892 A1    Jan. 19, 2017

Related U.S. Application Data

(62) Division of application No. 13/847,198, filed on Mar. 19, 2013, now Pat. No. 9,487,692.

(51) Int. Cl.
| | | |
|---|---|---|
| *C09K 8/512* | (2006.01) | |
| *C09K 8/56* | (2006.01) | |
| *C09K 8/506* | (2006.01) | |
| *C09K 8/575* | (2006.01) | |
| *C09K 8/80* | (2006.01) | |
| *C09K 8/62* | (2006.01) | |
| *E21B 43/26* | (2006.01) | |
| *E21B 43/267* | (2006.01) | |

(52) U.S. Cl.
CPC ............... *C09K 8/56* (2013.01); *C09K 8/506* (2013.01); *C09K 8/575* (2013.01); *C09K 8/62* (2013.01); *C09K 8/805* (2013.01); *E21B 43/261* (2013.01); *E21B 43/267* (2013.01)

(58) Field of Classification Search
CPC ...................................................... E21B 43/02
See application file for complete search history.

(56) References Cited

U.S. PATENT DOCUMENTS

| | | | |
|---|---|---|---|
| 4,042,032 A | 8/1977 | Anderson et al. | |
| 4,120,842 A | 10/1978 | Harnsberger | |
| 2007/0158070 A1 | 7/2007 | Endres et al. | |
| 2008/0145547 A1* | 6/2008 | Schneider | C08G 18/289 |
| | | | 427/386 |
| 2011/0030950 A1* | 2/2011 | Weaver | C09K 8/68 |
| | | | 166/276 |
| 2011/0257051 A1* | 10/2011 | Welton | C09K 8/502 |
| | | | 507/220 |
| 2012/0226002 A1 | 9/2012 | Arkles et al. | |

OTHER PUBLICATIONS

Supplementary European Search Report received in Application No. EP 14769913 dated Oct. 17, 2016.

* cited by examiner

*Primary Examiner* — William D Hutton, Jr.
*Assistant Examiner* — Avi T Skaist
(74) *Attorney, Agent, or Firm* — McDermott Will & Emery LLP

(57) ABSTRACT

Methods of treating a wellbore in a subterranean formation including providing a treatment fluid comprising a consolidating agent, wherein the consolidating agent comprises the reaction product of a furfuryl alcohol or a furfuryl alcohol derivative and a silicon derivative compound selected from the group consisting of a silane; a silanol; a silsesquioxane; any derivative thereof; and any combination thereof; introducing the treatment fluid into the wellbore in the subterranean formation; contacting the consolidating agent with a surface of the wellbore in the subterranean formation; and setting the consolidating agent.

11 Claims, No Drawings

METHODS FOR CONSOLIDATION TREATMENTS IN SUBTERRANEAN FORMATIONS USING SILICON COMPOUNDS DERIVED FROM FURFURYL ALCOHOLS

CROSS-REFERENCE TO RELATED APPLICATIONS

This application is a divisional of U.S. application Ser. No. 13/847,198, filed on Mar. 19, 2013 and published as U.S. Publication No. 2014/0284054 on Sep. 25, 2014 entitled "Methods for Consolidation Treatments In Subterranean Formations Using Silicon Compounds Derived from Furfuryl Alcohols."

BACKGROUND

The present disclosure relates to methods for consolidation treatments in subterranean formations using silicon compounds derived from furfuryl alcohols.

Subterranean wells (e.g., hydrocarbon producing wells or water producing wells) are often stimulated by hydraulic fracturing treatments. In hydraulic fracturing treatments, a viscous treatment fluid is pumped into a portion of a subterranean formation at a rate and pressure such that the subterranean formation breaks down and one or more fractures are formed. While the treatment fluid used to initiate the fracture is generally solids-free, particulate solids, such as graded sand, are typically introduced in a later portion of the treatment fluid and then deposited into the fractures. These particulate solids, or "proppant particulates," serve to prop the fracture open (e.g., keep the fracture from fully closing) after the hydraulic pressure is removed. By keeping the fracture from fully closing, the proppants aid in forming conductive paths through which produced fluids, such as hydrocarbons, may flow.

Hydraulic fracturing of subterranean wells is often performed in formations that contain unconsolidated particulates. The unconsolidated particulates may migrate out of the subterranean formation and be produced with production fluids. The presence of unconsolidated particulates in a formation during production is undesirable because they may damage or abrade producing equipment and/or reduce well production. For example, unconsolidated particulates may migrate into wellbore casings, perforations, or the interstitial spaces between packed proppants within a fracture and clog or hinder well production. As used herein, the term "unconsolidated particulates" refers to any loose or loosely bonded particulates that move freely with production fluids. Unconsolidated particulates may include, for example, particles and fines naturally found in the formation or particles that have been placed into the formation, such as sand, gravel, fluid loss particles, or drilling particles.

One method of controlling unconsolidated particulates in hydraulic fractured subterranean formations is to perform a gravel-packing treatment. In gravel-packing treatments, particulates are deposited into unconsolidated or weakly consolidated formation zones to create a physical barrier to the transport of unconsolidated particulates with the produced fluids. Typical gravel-packing treatments include placing a screen in a wellbore and packing the annulus between the screen and the wellbore with particulates of a certain size so as to prevent the transport of unconsolidated particulates with the produced fluids without compromising the conductivity of the well. Gravel-packing treatments, however, involve placement of additional unconsolidated particulates into the wellbore that, for example, may not be adequately maintained by a screen and that may, therefore, migrate with the produced fluids, contributing to the problem the gravel-packing treatment was attempting to solve.

Another method of controlling unconsolidated particulates is to resin treat the wellbore. In resin treatments, a resin is placed into the wellbore in order to stabilize unconsolidated particulates. Typically, the resin is used to enhance grain-to-grain or grain-to-formation contact of the unconsolidated particulates such that they are at immobilized or at least resistant to flow pressures of produced fluids. Often, either a silicon-based resin or a furfuryl alcohol-based resin treatment may be utilized. Silicon-based resins are often highly volatile and extremely costly. Moreover, silicon-based resins may provide an unwanted degree of pliability during consolidation treatments such that they fail to adequately consolidate unconsolidated particulates in a subterranean formation. For these reasons, silicon-based resins may not adequately consolidate unconsolidated particulates and may not be preferred due to their extreme expense.

Furfuryl alcohol-based resins may cure independently of a curing agent at extremely high temperatures, typically greater than 270° F. However, many subterranean formations do not reach such temperatures and furfuryl alcohol based resins traditionally require a curing agent at temperatures less than 250° F. However, furfuryl alcohol-based resins are far more cost effective than silicon-based resins, demonstrate chemical ease of use (e.g., handling, application, dilution, robustness, and the like), and are capable of consolidating low permeable formations without substantial interference with production of hydrocarbons, for example. However, furfuryl alcohol-based resins may suffer from brittleness in application. Accordingly, an ongoing need exists for methods of consolidating unconsolidated particulates in a subterranean formation.

DETAILED DESCRIPTION

The present disclosure relates to methods for consolidation treatments in subterranean formations using silicon compounds derived from furfuryl alcohols. More particularly, the present disclosure relates to the use of a consolidating agent formed by the reaction of a furfuryl alcohol or a furfuryl alcohol derivative and a silicon derivative. The consolidating agent of the present disclosure marries the benefits of silicon-based resins and furfuryl alcohol-based resins to provide a cost-effective, versatile, pliable, and resilient resin for consolidation treatments in subterranean formations. Indeed, the consolidating agent of the present disclosure may be used to treat and stabilize near-wellbore formations and fractures for sand control, formation fines control, proppant flow back control, and diagenesis protection, for example. Additionally, the consolidating agent of the present disclosure may be coated onto proppant particulates or proppant aggregates for proppant flow back control and proppant degradation protection, for example.

In some embodiments, the present disclosure provides a method of treating a wellbore in a subterranean formation using a consolidating agent, wherein the consolidating agent comprises the reaction product of a furfuryl alcohol or a furfuryl alcohol derivative and a silicon derivative compound selected from the group consisting of a siloxane; a silane; a silanol; a silsesquioxane; any derivative thereof; and any combination thereof. As used is this application the term "derivative" refers to "a compound arising from a parent compound by replacement of one atom with another atom or group of atoms. A suitable furfuryl alcohol derivative may include, for example, elastomeric or cross-linked products derived from a siloxane polymer. The consolidating agent is present in a treatment fluid that is introduced into the wellbore in the subterranean formation where it contacts a surface of the wellbore in the formation. The consolidating agent is then set. As used herein, the term "set" or "setting" as applied to the consolidating agent of the present disclosure refers to the hardening of a resin by any means or mechanism. The hardening of the resin may be such that the resin is substantially solid, but may be flexible or pliable.

The treatment fluids that may be used in the methods of the present disclosure may be used to enhance pumpability of the treatment fluid and/or provide an adequate delivery system for the components (e.g., consolidating agent) of the present disclosure. In addition, the treatment fluid may be used to dilute the consolidating agent to workable concentrations for use in the methods herein. Suitable base fluids for use in any of the treatment fluids of the present disclosure may include, but are not limited to, aqueous-based fluids and aqueous-miscible fluids. Suitable aqueous-based fluids may include fresh water; saltwater (e.g., water containing one or more salts dissolved therein); brine (e.g., saturated salt water); seawater; and any combination thereof. Suitable aqueous-miscible fluids may include, but not be limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any derivative thereof; any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combination thereof.

In some embodiments, the treatment fluids of the present disclosure may further comprise an additive, depending on the subterranean operation performed. Any additive that does not interfere with the operation of the methods of the present disclosure may be included. Suitable additives may include, but are not limited to, a salt; a weighting agent; an inert solid; a fluid loss control agent; a dispersion aid; a corrosion inhibitor; a viscosifying agent; a lost circulation material; a foaming agent; a gas; a pH control additive; a breaker; a biocide; a stabilizer; a scale inhibitor; a gas hydrate inhibitor; a friction reducer; a clay stabilizing agent; and any combination thereof.

In some embodiments, the methods of the present disclosure provide for coating proppant particulates with the consolidating agents of the present disclosure and introducing them into a fracture in a wellbore in a subterranean formation in the treatment fluids of the present disclosure. In those embodiments, it may be preferable that the treatment fluid is gelled so as to produce a viscous fluid that is capable of suspending the consolidating agent coated proppant particulates and preventing them from settling out of the treatment fluid. Suitable gelling agents may comprise any substance (e.g., a polymeric material) capable of increasing the viscosity of the treatment fluid. In certain embodiments, the gelling agent may comprise one or more polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring gelling agents; synthetic gelling agents; or a combination thereof. The gelling agents also may be cationic gelling agents; anionic gelling agents; or a combination thereof. Suitable gelling agents include, but are not limited to, polysaccharides; biopolymers; and/or derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose, and carboxymethylhydroxyethylcellulose); xanthan; scleroglucan; succinoglycan; diutan; and combinations thereof. In certain embodiments, the gelling agents comprise an organic carboxylated polymer, such as CMHPG.

Suitable synthetic polymer gelling agents include, but are not limited to, 2,2'-azobis(2,4-dimethyl valeronitrile); 2,2'-azobis(2,4-dimethyl-4-methoxy valeronitrile); polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride; acrylic acid; dimethylaminoethyl methacrylamide; dimethylaminoethyl methacrylate; dimethylaminopropyl methacrylamide; dimethyldiallylammonium chloride; dimethylethyl acrylate; fumaramide; methacrylamide; methacrylamidopropyl trimethyl ammonium chloride; methacrylamidopropyldimethyl-n-dodecylammonium chloride; methacrylamidopropyldimethyl-n-octylammonium chloride; methacrylamidopropyltrimethylammonium chloride; methacryloylalkyl trialkyl ammonium salts; methacryloylethyl trimethyl ammonium chloride; methacrylylamidopropyldimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any derivatives thereof; and any combinations thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer, such as those disclosed in U.S. Pat. Nos. 4,982,793, 5,067,565, and 5,122,549, the entire disclosures of which are incorporated herein by reference. Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the treatment fluids useful in the methods of the present disclosure in an amount sufficient to provide the desired viscosity. In some embodiments, the gelling agents may be present in an amount in the range of from about 0.1% to about 10% by weight of the treatment fluid. In other embodiments, the gelling agents may be present in an amount in the range of from about 0.15% to about 2.5% by weight of the treatment fluid.

In those embodiments of the present disclosure where it is desirable to crosslink the gelling agent, the treatment fluid may further comprise one or more crosslinking agents. The crosslinking agents may comprise a borate ion; a metal ion; or similar component that is capable of crosslinking at least two molecules of the gelling agent. Examples of suitable crosslinking agents include, but are not limited to, borate ions; magnesium ions; zirconium IV ions; titanium IV ions; aluminum ions; antimony ions; chromium ions; iron ions; copper ions; magnesium ions; and zinc ions. These ions may be provided by providing any compound that is capable of producing one or more of these ions. Examples of such compounds include, but are not limited to, ferric chloride; boric acid; disodium octaborate tetrahydrate; sodium diborate; pentaborates; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; antimony compounds; chromium compounds; iron compounds; copper compounds; zinc compounds; and any combinations thereof. In certain embodiments of the present disclosure, the crosslinking agent may be formulated to remain inactive until it is "activated" by, among other things, certain conditions in the treatment fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the type of gelling agent(s) included, the molecular weight of the gelling agent(s), the conditions in the subterranean formation being treated, the safety handling requirements, the pH of the treatment fluid, temperature, and/or the desired delay for the crosslinking agent to crosslink the gelling agent molecules.

When included, suitable crosslinking agents may be present in the treatment fluids useful in the methods of the present disclosure in an amount sufficient to provide the desired degree of crosslinking between molecules of the gelling agent(s). In certain embodiments, the crosslinking agent may be present in the treatment fluids of the present disclosure in an amount in the range of from about 0.005% to about 1% by weight of the treatment fluid. In certain embodiments, the crosslinking agent may be present in the treatment fluids of the present disclosure in an amount in the range of from about 0.05% to about 1% by weight of the treatment fluid. One of ordinary skill in the art, with the benefit of this disclosure, will recognize the appropriate amount of crosslinking agent to include in a treatment fluid of the present disclosure.

The consolidating agent of the present disclosure may be formed by the reaction of a furfuryl alcohol or a furfuryl alcohol derivative and a silicon-based silicon derivative compound selected from the group consisting of a siloxane; a silane; a silanol; a silsesquioxane; any derivatived thereof; and any combination thereof. As defined herein, the term "furfuryl alcohol derivative" refers to a compound deriving from furfuryl alcohol in which a substitution or addition of one or more of the atoms or radicals in the furfuryl alcohol nucleus has been made. Suitable examples of furfuryl alcohol derivatives include, but are not limited to, poly(furfuryl) alcohol; tetrahydrofurfuryl alcohol; furfuryl triphenylmethyl ether; 3,4-dihydro-2H-pyran; furfurylamine; tetrahydrofurfurylamine; 2-methylfuran; 2-methyltetrahydrofuran; furoic acid; methylfuran; methyltetrahydrofuran; and any combination thereof. Suitable examples are described in Hoydonckx, H. E., Van Rhijn, W. M., Van Rhijn, W., De Vos, D. E. and Jacobs, P. A. (2007) Furfural and Derivatives, Ullmann's Encyclopedia of Industrial Chemistry Vol 16, pp. 285-313, incorporated herein by reference in its entirety.

The furfuryl alcohol or furfuryl alcohol derivatives of the present disclosure are reacted with a silicon derivative. The silicone derivative compound may include, but is not limited to, a siloxane; a silane; a silanol; a silsesquioxane; any derivatives thereof, and any combinations thereof to form the consolidating agent of the present disclosure. The silicon derivative compounds of the present disclosure may contain hydrogen, vinyl, alkyl, methyl, and/or alkoxy substituents, which may be branched or linear and may contain up to about eighteen carbon atoms. As used herein, the term "siloxane" refers to oligomers having a silicon-oxygen-silicon linkage (e.g., silicone is the primary form of oligomeric siloxane). Siloxanes at low concentration may be capable of providing moisture protection to porous subterranean formation surfaces and may be suitably blended with the silanes of the present disclosure for optimum performance. Suitable examples of siloxanes that may be used for forming the consolidating agents of the present disclosure include, but are not limited to, a hexamethylcyclotrisiloxane; a hexamethyldisiloxane; an octamethylcyclotetrasiloxane; an octamethyltrisiloxane; a decamethylcyclopentasiloxane; a decamethyltetrasiloxane; a dodecamethylcyclohexasiloxane; a polydimethylsiloxane; an allyltris(trimethylsiloxy) silane; a 1,3-bis(3-aminopropyl)tetramethyldisiloxane; a 1,3-bis(chloromethyl)tetramethyldisiloxane; a 1,3-bis(4-hydroxybutyl)tetramethyldisiloxane); a 1,3-dichloro-1,1,3,3-tetraisopropyldisiloxane; a 1,3-dichloro-1,1,3,3-tetramethyldisiloxane; a 1,3-dimethoxy-1,1,3,3-tetraphyldisiloxane; a 3-(dimethylsilyoxy)-1,1,5,5-tetramethyl-3-phenyltrisiloxane; a 1,3-divinyltetramethyldisiloxane; a 1,1,1,3,5,5,5-heptamethyl-3-(3-glycidyloxypropyl)trisiloxane; a 1,1,1,3,5,5,5-heptamethyltrisiloxane; a tetrakis(dimethylsilyoxy)silane; a 1,1,3,3-tetramethyldisiloxane; a 2,4,6,8-tetramethyl-2,4,6,8-tetravinylcyclotetrasiloxane; a 1,1,3,3,-tetraphenyl-1,3-disiloxanediol; and any combination thereof.

As used herein, the term "silane" refers to a silicon monomer having 4 hydrogen bonds capable of reacting with any combination of an organic or inorganic group. Suitable silanes for use in the present disclosure may include, but are not limited to, a disilane; a trisilane; a tetrasilane; a pentasilane; a 2-silyltrisilane; a 2,2-disilytrisilane; a polysilane; a triethoxysilane; a methyldiethoxysilane; an alkoxysilane; a halosilane; an aminosilane; a chlorosilane; a N,O-bis(diethylhydrogensilyl)trifluoroacetamide; a 1,2-bis(dimethylsilyl)benzene; a tert-butyldimethylsilane; a tert-butyldiphenylsilane; a chlorodimethylsilane; a chlorodiisopropylsilane; a dichloromethylsilane; a methyldiphenylsilane; a dichloroethylsilane; a dimethoxy(methyl)silane; a dimethylphenylsilane; a diethoxymethylsilane; a diphenylsilane; a diphenylsilane; a di-tert-butylsilane; a diethylsilane; a phenylsilane; a trichlorosilane; a triphenylsilane; a triethylsilane; a 1,1,3,3-tetramethyldisilazane; a trimethoxysilane; a trihexylsilane; a triisopropylsilane; a tetrakis(dimethylsilyl)

silane; a 1,1,2,2-tetraphenyldisilane; a tribenzylsilane; a tributylsilane a substituted silane; and any combination thereof.

As used herein, the term "silanol" refers to a silicon atom having a hydroxyl group. Suitable examples of silanols that may be used in the present disclosure to form the consolidating agents described herein include, but are not limited to, a triethylsilanol; an arylsilanol; a diphenylsilanediol; an organosilanol; a diethyl(isopropyl)silanol; a triphenylsilanol; a N,N,O-tris(trimethylsilyl)hydroxylamine); and any combination thereof.

As used herein, the term "silsesquioxane" refers to a silicon compound having the chemical formula $R—Si—O_{3/2}$, where Si is silicon; O is oxygen; and R is a hydrogen or an organic group. The organic group may be, but is not limited to, an acrylate; an aryl; an alkyl; an amino; an ester; an epoxy; a vinyl; a fluorocarbon; an arylene group; a propyl methacryl; an ethylnorbornenyl; a methyl propionate; an ethyl undecanoate; a hydroxyl; a glycidyl; a 3-chloropropyl; a 3-cyanopropyl; a diphenylphosphinoethyl; or any derivatives thereof. Suitable silsesquioxanes include, but are not limited to, 1,3,5,7,9,11,13,15-octakis-(dimethylsilyloxy)-pentacyclo[$9.5.1.1^{3,9}.1^{5,15}.1^{7,13}$]octasiloxane; 1-(2-trans-cyclohexanediol)ethyl-3,5,7,9,11,13,15-isobutylpentacyclo-[$9.5.1.1^{3,9}.1^{5,15}.1^{7,13}$]octasiloxane; 1,3,5,7,9,11,14-heptacyclopentyl-tricyclo-[$7.3.3.1^{5,11}$]heptasiloxane-endo-3,7,14-triol; 1,3,5,7,9,11-octacyclopentyltetracyclo[$7.3.3.1^{5,11}$]octasiloxane-endo-3,7-diol; poly[(propylmethacryl-heptaisobutyl-PSS)-co-(n-butylmethacrylate)]; and any combination thereof.

In some non-limiting embodiments, the silicon derivative compounds of the present disclosure contain an alkyl bridging group bonded to an ester linkage derived from the furfuryl alcohol derivative, terahydrofurfuryl. In those embodiments, a polymerization reaction may be used to form copolymers (e.g., block copolymers) or terpolymers for use as the consolidating agents of the present disclosure. In other embodiments, a single silicon derivative compound may be reacted with multiple furfuryl alcohol or furfuryl alcohol derivative moieties. Preferably, the furfuryl alcohol or furfuryl alcohol derivative is linked to a terminal or pendant position on the silicon derivative compound of the present disclosure, which may itself have either a linear or branched backbone structure. This configuration may impart superior benefits to the function of the consolidating agent of the present disclosure to control unconsolidated particulates within a subterranean formation.

In some embodiments, the furfuryl alcohol or furfuryl alcohol derivative and the silicon derivative compound of the present disclosure is reacted in a ratio of about 1:1. In preferred embodiments, the furfuryl alcohol or the furfuryl alcohol derivative and the silicon derivative compound of the present disclosure is reacted in a ratio of about 3:1. In ever more preferred embodiments, the furfuryl alcohol or the furfuryl alcohol derivative and the silicon derivative compound of the present disclosure is reacted in a ratio of about 5:1. Other furfuryl alcohol to furfuryl alcohol derivative to silicon derivative ratios may be appropriate depending, for example, on the desired level of hardness, rigidity, and/or elasticity of the set consolidating agent.

Suitable examples of the consolidating agent of the present disclosure formed by the reaction product of a furfuryl alcohol or a furfuryl alcohol derivative and a silicon derivative compound include, but are not limited to, a (tetrahydrofurfuryloxypropyl)methylsiloxane-dimethylsiloxane; a (tetrahydrofurfuryloxypropyl)methylsiloxane-dimethylsiloxane-methylhydrogensiloxane; a tetrahydrofurfuryloxypropyl)methylsiloxane-dimethylsiloxane-methylvinylsiloxane; a tetrahydrofurfuryloxypropyltriethoxysilane; a tetrahydrofurfuryloxypropylheptamethyltrisiloxane; a (tetrahydrofurfuryloxymethyl)methyldiethoxysilane; and any combination thereof.

The consolidating agent of the present disclosure is set within the subterranean formation. In some embodiments, the setting of the consolidating agent occurs upon encountering a condition within the subterranean formation, such as, for example, a particular temperature, a particular pH, and the like. In other embodiments, the setting of the consolidating agent may occur by introducing a setting agent. As used herein, the term "setting agent" refers to any material capable of setting a consolidating agent, as defined herein. Suitable setting agents may include organic or inorganic acids including, but not limited to, maleic acid; fumaric acid; sodium bisulfate; hydrochloric acid; hydrofluoric acid; acetic acid; formic acid; phosphoric acid; sulfonic acid; alkyl benzene sulfonic acid (e.g., toluene sulfonic acid and dodecyl benzene sulfonic acid ("DDBSA")); and any combination thereof. In some embodiments, where it is included, the setting agent may be included in the methods of the present disclosure in an amount in the range of about 0.01% to about 20% by weight of the consolidating agent. In preferred embodiments, where it is included, the setting agent may be included in the methods of the present disclosure in an amount in the range of about 0.1% to about 5% by weight of the consolidating agent.

In those embodiments where the consolidating agent of the present disclosure is coated onto a proppant particulate, the consolidating agent coated proppant particulates may be introduced into an already created fracture in a wellbore in a subterranean formation in order to form a proppant pack. As used herein, the term "fracture" refers to any opening in a subterranean formation that has been either created or enhanced by a treatment operation and includes perforations, slots, borrowed holes, and the like. As used herein, the term "proppant pack" refers to a collection of proppant particulates (i.e., consolidating agent coated proppant particulates) within a fracture. In some embodiments of the present disclosure, the consolidating agent coated proppant particulates of the present disclosure may be introduced into a wellbore in a subterranean formation at a rate and pressure sufficient to create or enhance the at least one fracture therein.

The consolidating agent coated proppant particulates of the present disclosure may be prepared prior to introducing them into the wellbore in the subterranean formation. In other embodiments, the consolidating agent may be coated on the proppant particulates "on the fly." That is, the liquid consolidating agent is mixed with the proppant particulates at the well head and then immediately mixed into the treatment fluid for injection into the wellbore. In other embodiments, the consolidating agent and the proppant particulates may be introduced separately into the treatment fluid and allowed to interact therein to form the consolidating agent coated proppant particulates.

Suitable proppant particulates for use in the present disclosure may comprise any material suitable for use in a subterranean operation and include, but are not limited to, sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof. Suitable composite particulates may comprise a binder and a filler material wherein suitable filler materials include, but are not limited to, silica; alumina; fumed carbon; carbon black; graphite; mica; titanium dioxide; meta-silicate; calcium silicate; kaolin; talc; zirconia; boron; fly ash; hollow glass microspheres; solid glass; and any combination thereof. The mean size of the proppant particulates for use in the present disclosure generally may range from about 2 mesh to about 400 mesh on the U.S. Sieve Series; however, in certain circumstances, other mean sizes may be desired and will be entirely suitable for practice of the present disclosure. In particular embodiments, the preferred mean size distribution of the proppant particulates ranges are one or more of 6/12, 8/16, 12/20, 16/30, 20/40, 30/50, 40/60, 40/70, or 50/70 mesh. It should be understood that the term "proppant particulate" or "particulate," as used in this disclosure, includes all known shapes of materials, including substantially spherical materials; fibrous materials; polygonal materials (e.g., cubic materials); and any combination thereof. Moreover, fibrous materials may be included in certain embodiments of the present disclosure. In certain embodiments, the proppant particulates may be present in the treatment fluids of the present disclosure in an amount in the range of from about 0.5 pounds per gallon ("ppg") to about 30 ppg by volume of the treatment fluid.

In some embodiments, the present disclosure provides a method of treating a wellbore in a subterranean formation comprising first introducing a preflush fluid comprising a cationic surfactant into the wellbore. Thereafter, a treatment fluid comprising a consolidating agent formed from the reaction product of a furfuryl alcohol or a furfuryl alcohol derivative and a silicon derivative compound selected from the group consisting of a siloxane; a silane; a silanol; a silsesquioxane; any derivative thereof; and any combination thereof, a solvent, and an acid catalyst is introduced into the wellbore in the subterranean formation. Finally, the consolidating agent is set. In some embodiments, an overflush fluid comprising a cationic surfactant may be introduced after the treatment fluid and before the consolidating agent is set.

Use of a preflush may serve to displace formation brines away from the surface of the wellbore so as to decrease the possibility of pore plugging, as well as to dissolve calcareous or iron scale materials that may interfere with production of the well. Use of an overflush may serve to remove residual treatment fluids and treatment fluid components (e.g., excess consolidating agent may cause pore plugging). The preflush and overflush fluids of the present disclosure may be comprised of any of the base fluids suitable for use in the treatment fluids of the present disclosure described above including, but not limited to, aqueous-based fluids and aqueous-miscible fluids.

The cationic surfactants for use in the present disclosure may facilitate coating of the consolidating agent onto surfaces (e.g., subterranean formation surfaces or proppant particulates). Suitable cationic surfactants for use as the cationic surfactant in either the preflush or overflush fluids of the present disclosure may include, but are not limited to, cocoalkyltriethyl ammonium chloride; hexadecyltrimethyl ammonium chloride; alkyl phosphonate; or any combination thereof. In preferred embodiments, the cationic surfactant is an alkyl phosphonate in at least one of the preflush or overflush fluids. In more preferred embodiments, the cationic surfactant is an alkyl phosphonate in both the preflush and the overflush fluids. Typically, the cationic surfactant is present in the preflush fluid or the overflush fluid of the present disclosure in an amount in the range of about 0.01% to 10% by weight of the fluid, or preferably in an amount in the range of about 0.5% to about 2% by weight of the fluid.

Any solvent that is compatible with the consolidating agents of the present disclosure and that achieves the desired viscosity effect is suitable for use in the present disclosure. The solvent may serve to reduce the viscosity for ease of handling, mixing, and transferring. Suitable solvents may include, but are not limited to, butyl lactate; dipropylene glycol methyl ether; dipropylene glycol dimethyl ether; dimethyl formamide; diethyleneglycol methyl ether; ethyleneglycol butyl ether; diethyleneglycol butyl ether; propylene carbonate; methanol; butyl alcohol; d'limonene; fatty acid methyl ester; butylglycidyl ether; and any combination thereof. Other preferred solvents may include aqueous dissolvable solvents such as, for example, methanol; isopropanol; butanol; glycol ether solvent; and any combination thereof. Suitable glycol ether solvents include, but are not limited to, diethylene glycol methyl ether; dipropylene glycol methyl ether; 2-butoxy ethanol; ethers of a C2 to C6 dihydric alkanol containing at least one C1 to C6 alkyl group, mono ethers of dihydric alkanols; methoxypropanol; butoxyethanol; hexoxyethanol; and isomers thereof. Selection of an appropriate solvent is dependent on the consolidating agent chosen and is within the ability of one skilled in the art, with the benefit of this disclosure. In some embodiments, the amount of the solvent used in treatment fluids of the present disclosure may be in the range of about 0.1% to about 90% by weight of the consolidating agent.

Thus, some embodiments of the present disclosure provide:

Embodiment A

A method of treating a wellbore in a subterranean formation comprising: providing a treatment fluid comprising a consolidating agent and a setting agent, wherein the consolidating agent comprises the reaction product of a furfuryl alcohol or a furfuryl alcohol derivative and a silicon derivative compound selected from the group consisting of a silane; a silanol; a silsesquioxane; any derivative thereof; and any combination thereof, wherein the ratio of the furfuryl alcohol or the furfuryl alcohol derivative to the silicon derivative is in a range of 4:1 to about 5:1, such that the consolidating agent is flexible upon setting, and wherein the setting agent is present in a range of about 0.01% to about 20% by weight of the consolidating agent; introducing the treatment fluid into the wellbore in the subterranean formation; contacting the consolidating agent with a surface of the wellbore in the subterranean formation; and setting the consolidating agent.

Embodiment B

A method of treating a wellbore in a subterranean formation comprising: providing a treatment fluid comprising a setting agent; providing a consolidating agent, wherein the setting agent is present in the treatment fluid in a range of about 0.01% to about 20% by weight of the consolidating agent, wherein the consolidating agent comprises the reaction product of a furfuryl alcohol or a furfuryl alcohol derivative and a silicon derivative compound selected from the group consisting of a silane; a silanol; a silsesquioxane; any derivative thereof; and any combination thereof, and wherein the ratio of the furfuryl alcohol or the furfuryl alcohol derivative to the silicon derivative is in a range of 4:1 to about 5:1, such that the consolidating agent is flexible upon setting; providing proppant particulates; coating the proppant particulates with the consolidating agent so as to produce consolidating agent coated proppant particulates; introducing the consolidating agent coated proppant particulates into the treatment fluid; introducing the treatment fluid comprising the consolidating agent coated proppant particulates into at least one fracture in the wellbore in the subterranean formation; and setting the consolidating agent.

Embodiment C

A method of treating a wellbore in a subterranean formation comprising: providing a preflush fluid comprising a first cationic surfactant; providing an overflush fluid comprising a second cationic surfactant; providing a treatment fluid comprising a consolidating agent, a solvent, a setting agent, and an acid catalyst; wherein the consolidating agent comprises the reaction product of a furfuryl alcohol or a furfuryl alcohol derivative and a silicon derivative compound selected from the group consisting of a silane; a silanol; a silsesquioxane; any derivative thereof; and any combination thereof, wherein a ratio of the furfuryl alcohol or the furfuryl alcohol derivative to the silicon derivative is in a range of 4:1 to about 5:1, such that the consolidating agent is flexible upon setting, and wherein the setting agent is present in a range of about 0.01% to about 20% by weight of the consolidating agent; introducing the preflush fluid into the wellbore in the subterranean formation; introducing the treatment fluid into the wellbore in the subterranean formation; introducing the overflush fluid into the wellbore in the subterranean formation; and setting the consolidating agent.

Each of embodiments A, B, and C may have one or more of the following non-limiting additional elements in any non-limiting combination:

Element 1: Wherein the silane is selected from the group consisting of a disilane; a trisilane; a tetrasilane; a pentasilane; a 2-silyltrisilane; a 2,2-disilytrisilane; a polysilane; a triethoxysilane; a methyldiethoxysilane; an alkoxysilane; a halosilane; an aminosilane; a chlorosilane; a N,O-bis(diethylhydrogensilyl)trifluoroacetamide; a 1,2-bis(dimethylsilyl) benzene; a tert-butyldimethylsilane; a tert-butyldiphenylsilane; a chlorodimethylsilane; a chlorodiisopropylsilane; a dichloromethylsilane; a methyldiphenylsilane; a dichloroethylsilane; a dimethoxy(methyl)silane; a dimethylphenylsilane; a diethoxymethylsilane; a diphenylsilane; a diphenylsilane; a di-tert-butylsilane; a diethylsilane; a phenylsilane; a trichlorosilane; a triphenylsilane; a triethylsilane; a 1,1,3,3-tetramethyldisilazane; a trimethoxysilane; a trihexylsilane; a triisopropylsilane; a tetrakis(dimethylsilyl) silane; a 1,1,2,2-tetraphenyldisilane; a tribenzylsilane; a tributylsilane a substituted silane; and any combination thereof.

Element 2: Wherein the silanol is selected from the group consisting of a triethylsilanol; an arylsilanol; a diphenylsilanediol; an organosilanol; a diethyl(isopropyl)silanol; a triphenylsilanol; a N,N,O-tris(trimethylsilyl)hydroxylamine); and any combination thereof.

Element 3: Wherein the silsesquioxane has the chemical formula of R—Si—$O_{3/2}$, where Si is silicon; O is oxygen; and R is a hydrogen or an organic group.

Element 4: Wherein the reaction product of the furfuryl alcohol or the furfuryl alcohol derivative and the silicon derivative compound is a (tetrahydrofurfuryloxymethyl)methyldiethoxysilane.

Element 5: Wherein when the treatment fluid comprises the consolidating agent coated proppant particulates, the treatment fluid is introduced at a rate and pressure sufficient to create or enhance the at least one fracture in the wellbore in the subterranean formation.

Element 6: Wherein when a preflush fluid is used comprising the first cationic surfactant or when an overflush fluid is used comprising the second cationic surfactant, the first cationic surfactant or the second cationic surfactant is selected from the group consisting of cocoalkyltriethyl ammonium chloride; hexadecyltrimethyl ammonium chloride; alkyl phosphonate; or any combination thereof.

While any of the above combinations is specifically contemplated herein, some non-limiting examples applicable to A, B, and/or C include: 1-6; 1 and 2; 1 and 3; 1 and 4; 1 and 5; 1 and 6; 2 and 3; 2 and 4; 2 and 5; 2 and 6; 3 and 4; 3 and 5; 3 and 6; 4 and 5; 4 and 6; 5 and 6; 1, 2, and 3; 1, 2, and 4; 1, 2, and 5; 1, 2, and 6; 1, 3, and 4; 1, 3, and 5; 1, 3, and 6; 4, 5, and 6; 1, 3, 5, and 6; and the like, and any combination of 1-6, without limitation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:
1. A method of treating a wellbore in a subterranean formation comprising:
   providing a treatment fluid comprising a consolidating agent and a setting agent, wherein the consolidating agent comprises the reaction product of a furfuryl alcohol or a furfuryl alcohol derivative a silane,
   wherein the ratio of the furfuryl alcohol or the furfuryl alcohol derivative to silane is in a range of 4:1 to about 5:1, such that the consolidating agent is flexible upon setting, and wherein the setting agent is present in a range of about 0.01% to about 20% by weight of the consolidating agent;

introducing the treatment fluid into the wellbore in the subterranean formation;

contacting the consolidating agent with a surface of the wellbore in the subterranean formation; and setting the consolidating agent.

2. The method of claim 1, wherein the silane is selected from the group consisting of a disilane; a trisilane; a tetrasilane; a pentasilane; a 2-silyltrisilane; a 2,2-disilytrisilane; a polysilane; a triethoxysilane; a methyldiethoxysilane; an alkoxysilane; a halosilane; an aminosilane; a chlorosilane; a N,O-bis(diethylhydrogensilyl)trifluoroacetamide; a 1,2-bis (dimethylsilyl)benzene; a tert-butyldimethylsilane; a tert-butyldiphenylsilane; a chlorodimethylsilane; a chlorodiisopropylsilane; a dichloromethylsilane; a methyldiphenylsilane; a dichloroethylsilane; a dimethoxy (methyl)silane; a dimethylphenylsilane; a diethoxymethylsilane; a diphenylsilane; a diphenylsilane; a di-tert-butylsilane; a diethylsilane; a phenylsilane; a trichlorosilane; a triphenylsilane; a triethylsilane; a 1,1,3,3-tetramethyldisilazane; a trimethoxysilane; a trihexylsilane; a triisopropylsilane; a tetrakis(dimethylsilyl)silane; a 1,1,2,2-tetraphenyldisilane; a tribenzylsilane; a tributylsilane a substituted silane; and any combination thereof.

3. The method of claim 1, wherein the reaction product of the furfuryl alcohol or the furfuryl alcohol derivative and the silane is a (tetrahydrofurfuryloxymethyl)methyldiethoxysilane.

4. A method of treating a wellbore in a subterranean formation comprising:

providing a treatment fluid comprising a setting agent;

providing a consolidating agent,
  wherein the setting agent is present in the treatment fluid in a range of about 0.01% to about 20% by weight of the consolidating agent,
  wherein the consolidating agent comprises the reaction product of a furfuryl alcohol or a furfuryl alcohol derivative and a silane, and
  wherein the ratio of the furfuryl alcohol or the furfuryl alcohol derivative to the silane is in a range of 4:1 to about 5:1, such that the consolidating agent is flexible upon setting;

providing proppant particulates;

coating the proppant particulates with the consolidating agent so as to produce consolidating agent coated proppant particulates;

introducing the consolidating agent coated proppant particulates into the treatment fluid;

introducing the treatment fluid comprising the consolidating agent coated proppant particulates into at least one fracture in the wellbore in the subterranean formation; and setting the consolidating agent.

5. The method of claim 4, wherein the treatment fluid comprising the consolidating agent coated proppant particulates is introduced at a rate and pressure sufficient to create or enhance the at least one fracture in the wellbore in the subterranean formation.

6. The method of claim 4, wherein the silane is selected from the group consisting of a disilane; a trisilane; a tetrasilane; a pentasilane; a 2-silyltrisilane; a 2,2-disilytrisilane; a polysilane; a triethoxysilane; a methyldiethoxysilane; an alkoxysilane; a halosilane; an aminosilane; a chlorosilane; a N,O-bis(diethylhydrogensilyl)trifluoroacetamide; a 1,2-bis (dimethylsilyl)benzene; a tert-butyldimethylsilane; a tert-butyldiphenylsilane; a chlorodimethylsilane; a chlorodiisopropylsilane; a dichloromethylsilane; a methyldiphenylsilane; a dichloroethylsilane; a dimethoxy (methyl)silane; a dimethylphenylsilane; a diethoxymethylsilane; a diphenylsilane; a diphenylsilane; a di-tert-butylsilane; a diethylsilane; a phenylsilane; a trichlorosilane; a triphenylsilane; a triethylsilane; a 1,1,3,3-tetramethyldisilazane; a trimethoxysilane; a trihexylsilane; a triisopropylsilane; a tetrakis(dimethylsilyl)silane; a 1,1,2,2-tetraphenyldisilane; a tribenzylsilane; a tributylsilane a substituted silane; and any combination thereof.

7. The method of claim 4, wherein the reaction product of the furfuryl alcohol or the furfuryl alcohol derivative and the silane is a (tetrahydrofurfuryloxymethyl)methyldiethoxysilane.

8. A method of treating a wellbore in a subterranean formation comprising:

providing a preflush fluid comprising a first cationic surfactant;

providing an overflush fluid comprising a second cationic surfactant;

providing a treatment fluid comprising a consolidating agent, a solvent, a setting agent, and an acid catalyst,
  wherein the consolidating agent comprises the reaction product of a furfuryl alcohol or a furfuryl alcohol derivative and a silane,
  wherein a ratio of the furfuryl alcohol or the furfuryl alcohol derivative to silane is in a range of 4:1 to about 5:1, such that the consolidating agent is flexible upon setting, and
  wherein the setting agent is present in a range of about 0.01% to about 20% by weight of the consolidating agent;

introducing the preflush fluid into the wellbore in the subterranean formation;

introducing the treatment fluid into the wellbore in the subterranean formation;

introducing the overflush fluid into the wellbore in the subterranean formation; and setting the consolidating agent.

9. The method of claim 8, wherein the first cationic surfactant or the second cationic surfactant is selected from the group consisting of cocoalkyltriethyl ammonium chloride; hexadecyltrimethyl ammonium chloride; alkyl phosphonate; or any combination thereof.

10. The method of claim 8, wherein the silane is selected from the group consisting of a disilane; a trisilane; a tetrasilane; a pentasilane; a 2-silyltrisilane; a 2,2-disilytrisilane; a polysilane; a triethoxysilane; a methyldiethoxysilane; an alkoxysilane; a halosilane; an aminosilane; a chlorosilane; a N,O-bis(diethylhydrogensilyl)trifluoroacetamide; a 1,2-bis (dimethylsilyl)benzene; a tert-butyldimethylsilane; a tert-butyldiphenylsilane; a chlorodimethylsilane; a chlorodiisopropylsilane; a dichloromethylsilane; a methyldiphenylsilane; a dichloroethylsilane; a dimethoxy (methyl)silane; a dimethylphenylsilane; a diethoxymethylsilane; a diphenylsilane; a diphenylsilane; a di-tert-butylsilane; a diethylsilane; a phenylsilane; a trichlorosilane; a triphenylsilane; a triethylsilane; a 1,1,3,3-tetramethyldisilazane; a trimethoxysilane; a trihexylsilane; a triisopropylsilane; a tetrakis(dimethylsilyl)silane; a 1,1,2,2-tetraphenyldisilane; a tribenzylsilane; a tributylsilane a substituted silane; and any combination thereof.

11. The method of claim 8, wherein the reaction product of the furfuryl alcohol or the furfuryl alcohol derivative and the silane is a (tetrahydrofurfuryloxymethyl)methyldiethoxysilane.

* * * * *